Patented June 14, 1949

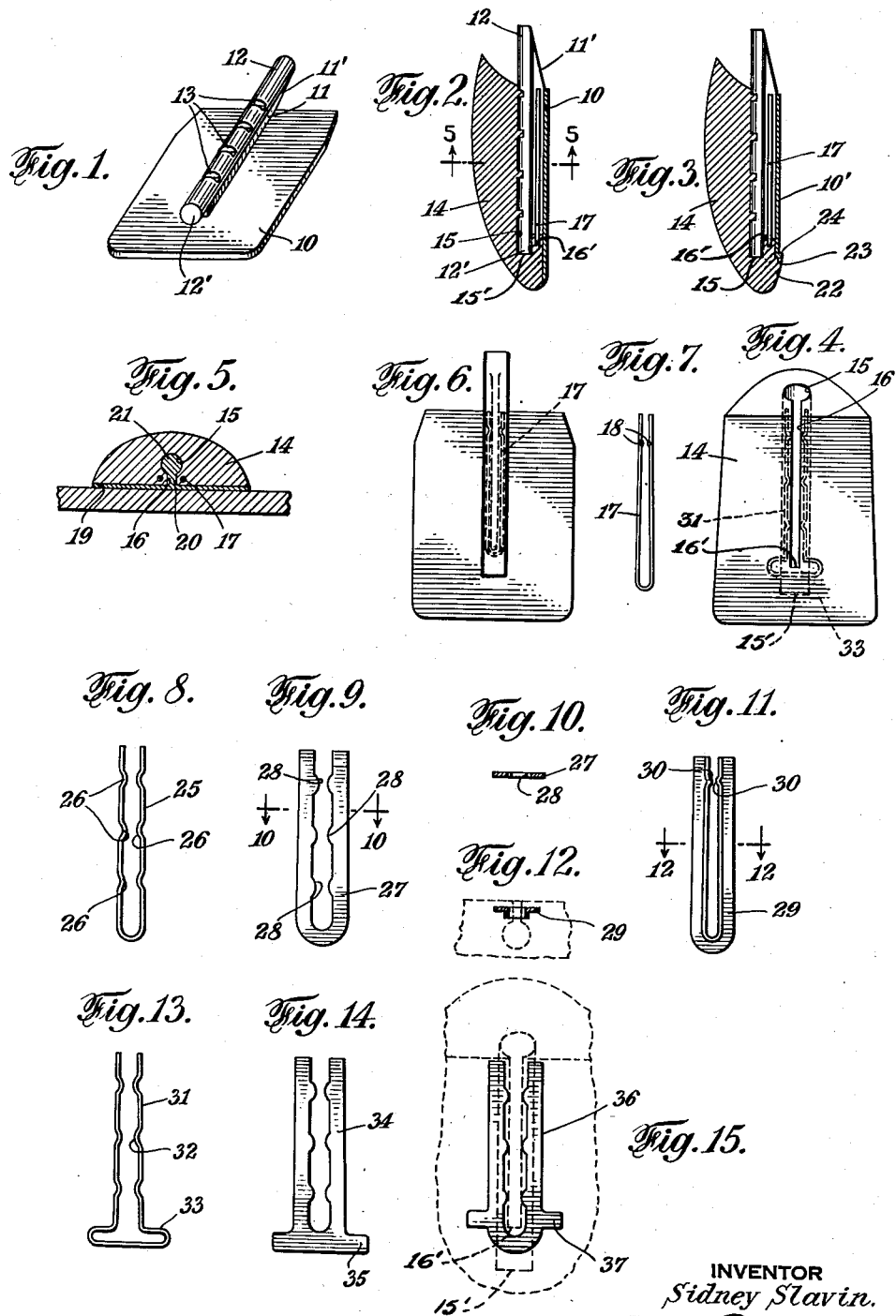

2,473,396

UNITED STATES PATENT OFFICE 2,473,396

REINFORCED PLASTIC TOOTH

Sidney Slavin, Brooklyn, N. Y.

Application April 10, 1946, Serial No. 660,916

4 Claims. (Cl. 32—9)

The present invention relates generally to artificial teeth, and particularly to interchangeable teeth provided with slots or recesses for the reception of anchoring pins employed with backing plates, whereby the denture is secured in position.

A very serious drawback of such artificial teeth is their relative weakness along their pin-receiving slots, in consequence whereof they break readily and must be replaced. Developments in artificial tooth structure indicate the employment of reinforcements provided especially in teeth made of porcelain. Such reinforcements usually comprise metal pockets or similar arrangements, which are relatively large and bulky in comparison with the body of the tooth and rather weaken the tooth structure instead of reinforcing it. In order to overcome such weakening of a tooth structure by bulky reinforcements, some of the tooth designs provide reinforcing plates directly secured to the back of the tooth.

Experiments have proven that relatively lightweight and small-bodied reinforcements properly placed along the edges of the tooth recess, not only suffice, but are more effective than the aforementioned complicated and bulky reinforcing devices, and decidedly obviate additional strengthening plates at the back of the tooth.

The provision of reinforcements in artificial teeth, especially those made of porcelain, require care and accurate fabrication, with the result that the cost of such artificial teeth is rather high. The present trend is directed away from porcelain teeth and towards teeth made of thermo-setting plastics, which latter are not as brittle as porcelain, but are tough and come far nearer in appearance to natural teeth, and in many other respects are superior to porcelain teeth. They require, however, special treatment when relatively thin sections are required, such as along the edges of the recess for receiving the pin of the backing plate.

The present invention has for its prime object a very simple method of producing artificial plastic teeth provided with relatively light, but highly effective reinforcements along the edges of their pin recess, whereby such reinforcements are suspended in a desired position prior to the formation of the body of the teeth, whereupon the plastic tooth material is molded about the reinforcement, which latter becomes completely encased within the tooth material along the edge formation of the posterior recess provided in the tooth body.

Another object of the present invention is the provision of an artificial tooth made from thermoplastic material, wherein the marginal edge portions of the recess for the reception of the pin of the backing plate are provided with imbedded reinforcements, and which latter are not visible through the tooth material when observed from the exterior face of the tooth.

As is well known in the art, the dentist is required to attach the artificial tooth body to a backing plate, preferably made of metal. The backing plate is equipped with a pin designed to pass into a corresponding recess provided in the tooth body. When the tooth is properly fitted to the pin, it is cemented into place.

The recess in the tooth is usually so constructed that its closed end forms a pocket into which the shorter end of the pin projects. It is mostly at this pocket-forming portion of the tooth where the body of the tooth breaks. It especially often happens that the upper edge of the pocket gives and starts a break which progresses along the edges of the recess for the pin of the backing plate. The pin of the backing plate is usually distanced from and secured to the plate by a relatively thin neck or spacer. The recess in the tooth body has a relatively narrow slot for the reception of the spacer, and a cylindrical cavity for accommodating the pin body. This spacer is adapted to slide between the edges of the slot, while the pin, being larger than the spacer, anchors the tooth in place when forced into the cylindrical pocket cavity at the lower end of the recess.

The present invention proposes the effective reinforcement of the slot edge engaged by the spacer and by that portion of the pin which is secured to the spacer, and wherein such reinforcement is completely imbedded within the tooth material and does not come in contact with the pin body. The reinforcing element imbedded in the plastic tooth material thus forms a sturdy core and strengthens the edge area of the recess. The construction of the proposed tooth and the method whereby the edges of the recess are being reinforced will be more fully understood from the ensuing description in conjunction with the accompanying drawings, which latter, although illustrating specific embodiments of the present invention, are by no means intended to restrict the latter to the actual showing and in which:

Fig. 1 is a perspective view of a typical backing plate;

Fig. 2 is a vertical cross section through an artificial tooth in accordance with the present invention;

Fig. 3 is a modified form of an artificial tooth provided with a ledge for a ledged backing plate;

Fig. 4 is a rear view of a tooth with reinforced edges of its pin-receiving recess, in accordance with the present invention;

Fig. 5 is a typical section through a tooth such as taken on line 5—5 of Fig. 2;

Fig. 6 is a plan view of a backing plate with a resilient reinforcement attached thereto;

Fig. 7 illustrates one form of a resilient reinforcement intended for the edge formation of the recess in the tooth;

Figs. 8 and 9 illustrate other structures of reinforcing elements;

Fig. 10 is a section taken on line 10—10 through Fig. 9;

Fig. 11 is another form of a reinforcing element;

Fig. 12 is a section taken on line 12—12 through Fig. 11; and

Figs. 13, 14 and 15 illustrate modified embodiments of reinforcing elements with side extensions.

Referring now specifically to Fig. 1, numeral 10 denotes the usual type of a backing plate to which is connected by means of a relatively thin spacer or neck 11 an anchoring pin 12, preferably provided with recesses 13 for facilitating cementing an artificial tooth to the pin. Such plate is shown also in Fig. 2. Considering these two figures, it will be observed that pin 12 extends above the upper edge of the plate and that neck or spacer 11 diminishes in cross section toward the upper end of the pin, as indicated at 11'. Neck 11 does not extend over the entire length of the pin, whereby the lower end 12' thereof is left free for reasons explained hereinafter.

The body of an artificial tooth is indicated at 14 in Figs. 2, 3, 4 and 5. It will be observed that a cylindrical recess 15 is formed in the body for accommodating pin 12, and that a narrow slot 16 connects the back face of the tooth body with recess 15, reference being had to Figs. 4 and 5. It will be also observed from Fig. 4, that recess 15 is longer than slot 16 in that it extends further toward the biting edge of the tooth. This extension of recess 15 forms a pocket 15' which is intended to accommodate free end 12' of the pin.

In consulting Fig. 4 it will be readily evident that the weakest portion of the tooth is the relatively slim edge along slot 16 and especially the top edge 16' of pocket 15', which has to withstand all the force exerted upon the tooth in the process of biting. The biting function of the tooth is not merely a cleaving function, but the tooth is subjected to twisting and other stresses, all of which must be absorbed by the edge formation along slot 16. That edge formation, therefore, must be strong enough to withstand the stresses incidental to the biting function of the tooth.

The present invention contemplates the strengthening of the tooth material along this slot edge by imbedding therein a solid core made of metal, which latter is intended to not only absorb most of the strain exerted against the edge, but to also substantially strengthen the tooth material itself in the vicinity of the edge.

The present method provides the application of a substantially hairpin-shaped reinforcing element, which is preferably made of resilient material and which is suspended in such a position that when the tooth material is molded, the entire body of the element will be completely encased within the tooth material, with but very minor exceptions.

Referring now to Figs. 5, 6 and 7, there is indicated at 17 a hairpin-like resilient reinforcing member which is preferably expanded near the ends of its free legs, as clearly shown at 18 in Fig. 7.

In molding an artificial tooth, forms are provided resembling backing plates such as shown at 19 in Fig. 5, and to which form there is attached a replica 20 of a spacer member 11 and a replica 21 of pin 12. Reinforcing element 17 is then slipped into position as shown in Fig. 5. Due to its resiliency the element will forcibly bear with its struck-out portions 18 against the sides of neck portion 20, and the body of the element will be held in spaced position from the side faces of the neck. Since only the struck-out enlargements 18 actually engage the faces of neck portion 20 at one point, the rest of the reinforcement is actually freely suspended.

While the reinforcing element is maintained in that position, the tooth material is molded about members 20 and 21 in the manner shown in Fig. 5, the upper portion of the mold being omitted. When the tooth material solidifies, reinforcing element 17 remains completely surrounded by the tooth material. Thus neither anchoring pin 12 nor the neck or spacer 11 can ever come in direct contact with the reinforcement, with the exception perhaps at the points where spacing enlargements 18 or their equivalents have penetrated through the material. When the tooth is mounted upon the backing plate, pin 12 and spacer 11 bear against, what may be termed, a cushion of tooth material, which is materially strengthened by reinforcement 17 imbedded in the material.

The backing plate shown in Figs. 1, 2, 5 and 6 is provided with a plain surface intended to be cemented to a similar plain back face of the tooth body. In some cases, however, it is desired to reinforce the biting portion of the tooth, in which case there is added tooth material at the back and lower part of the tooth, as shown at 22 in Fig. 3, so that a step or ledge 23 is formed. Backing plate 10' is provided with an angular extension 24 adapted to rest against ledge 23.

In Figs. 2 and 3 the reinforcing element 17 corresponds substantially in shape to that shown in Fig. 7. However, other forms of reinforcements may be employed, such as indicated in Fig. 8. In this embodiment the hairpin-shaped reinforcement 25 is undulated at various places as shown at 26, but otherwise the body of the reinforcement is very similar to element 17. Undulations 26 serve for engagement with the neck part 20 and as spacer between the latter and the wire body of reinforcement 25.

Figs. 9 and 10 illustrate a flat wire reinforcement 27 provided with broadened portions 28 similar to undulations 26 of Fig. 8. Also these broadened portions of the reinforcing element are intended for the same purpose as undulations 26 and enlargements 18 of the round wire reinforcing elements, that is to tensionally engage member 20 of the mold assembly during the molding operation of the tooth material.

Another modified form of a reinforcement is shown in Figs. 11 and 12, wherein the reinforcing element takes an angular form 29 as clearly seen in Fig. 12. Near the leg ends of this element there are provided inwardly directed indentations 30 for engaging member 20 of the mold.

Other embodiments of reinforcing elements are illustrated in Figs. 13, 14 and 15. Fig. 13 shows a wire structure 31 having undulations 32, and being provided at its lower end with looped side extensions 33 which are intended to reinforce portion 15' of tooth recess 15 which extends into the tooth material beyond bottom edge 16' of slot 16. Fig. 14 illustrates a flat wire reinforcing element 34 similar to that shown in Fig. 9, but provided with solid side reinforcing extensions 35 similar to extension 33 of Fig. 13.

Still another modification is presented in Fig. 15, where reinforcing element 36 is generally similar to that shown in Fig. 14, but where the reinforcing extensions 37 are placed somewhat higher than reinforcement 35.

Although the reinforcing elements shown in Figs. 9, 11, 14 and 15 are intended to be made from flat wire stock, they may be stamped from sheet metal or may be produced in any other desired manner. The type of reinforcements shown in Figs. 7, 8 and 13 are preferably formed from round wire stock.

The disclosure of different embodiments of reinforcing elements has for its purpose to indicate that a great variety of shapes may be employed for the most effective reinforcement of the frail edges of the recesses provided in artificial teeth, so as to assure firmness and lasting security for teeth designed for different functions. However, all of these elements are intended to be fully imbedded or encased within the tooth material, and especially of the thermoplastic type, in the same manner as described in connection with reinforcement 17.

Having thus explained the present method and the resulting product, the following are the claims made for this invention.

I claim:

1. A reinforced artificial tooth, comprising a plastic body having a recess for receiving the pin of a backing plate, a substantially hairpin-shaped, resilient reinforcement provided along the edges of the recess and about its closed end, said reinforcement being imbedded in and covered, substantially by the tooth material.

2. A reinforced artificial tooth as per claim 1, said reinforcement comprising a wire structure having a loop formation at one end, the latter extending across the closed terminus of the recess.

3. A reinforced artificial tooth as per claim 1, said reinforcement comprising a wire structure having a looped formation at one end and spacing means at its other end, the looped end extending across the closed terminus of the recess, the spacing means facilitating the encasement of the wire structure in the tooth material.

4. An artificial tooth made of thermoplastic material and provided with a recess for the reception of a backing plate pin, a reinforcing element extending along the entire edge formation of the recess and being imbedded, substantially, within the tooth material of that edge formation, said reinforcing element having a looped end provided with an enlargement disposed in the vicinity of the closed terminus of the recess.

SIDNEY SLAVIN.

REFERENCES CITED

The following references are of record in the file of this patent:

UNITED STATES PATENTS

| Number | Name | Date |
|---|---|---|
| 897,518 | Bloom | Sept. 1, 1908 |
| 1,804,898 | Toft | May 12, 1931 |
| 2,295,864 | Prange | Sept. 15, 1942 |